(12) United States Patent
Wang et al.

(10) Patent No.: US 9,967,526 B2
(45) Date of Patent: May 8, 2018

(54) IMAGE PROCESSING DEVICE AND STORAGE MEDIUM

(71) Applicants: DENSO CORPORATION, Kariya, Aichi-pref. (JP); NIPPON SOKEN, INC., Nishio, Aichi-pref. (JP)

(72) Inventors: Bingchen Wang, Okazaki (JP); Hirohiko Yanagawa, Chiryu (JP); Masakazu Takeichi, Okazaki (JP); Masayuki Imanishi, Okazaki (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 564 days.

(21) Appl. No.: 14/421,204

(22) PCT Filed: Aug. 23, 2013

(86) PCT No.: PCT/JP2013/004988
§ 371 (c)(1),
(2) Date: Feb. 12, 2015

(87) PCT Pub. No.: WO2014/034064
PCT Pub. Date: Mar. 6, 2014

(65) Prior Publication Data
US 2015/0208041 A1 Jul. 23, 2015

(30) Foreign Application Priority Data
Aug. 30, 2012 (JP) .................. 2012-190056

(51) Int. Cl.
*H04N 7/18* (2006.01)
*B60R 1/00* (2006.01)
*G06T 3/40* (2006.01)

(52) U.S. Cl.
CPC ............... *H04N 7/183* (2013.01); *B60R 1/00* (2013.01); *G06T 3/4038* (2013.01); *B60R 2300/402* (2013.01)

(58) Field of Classification Search
CPC ... B60R 1/00; B60R 2300/402; G06T 3/4038; H04N 7/183
See application file for complete search history.

(56) References Cited

U.S. PATENT DOCUMENTS

2008/0186384 A1* 8/2008 Ishii .................... G06T 7/80
                                                        348/187
2009/0015675 A1 1/2009 Yang
(Continued)

FOREIGN PATENT DOCUMENTS

JP    H10-211849 A    8/1998
JP    2003-191810 A   7/2003
(Continued)

OTHER PUBLICATIONS

International Search Report of the International Searching Authority dated Oct. 15, 2013 for the corresponding International application No. PCT/JP2013/004988 (and English translation).

(Continued)

*Primary Examiner* — Sath V Perungavoor
*Assistant Examiner* — Peet Dhillon
(74) *Attorney, Agent, or Firm* — Posz Law Group, PLC

(57) ABSTRACT

An image processing device includes an image input section inputting images taken by a vehicle camera, a calibration target specifying section specifying a calibration target included both in a first image and in a second image, a vehicle information input section inputting information indicating travel distance and orientation change of the vehicle, a calculation section, and a storing control section. The calculation section converts the first and the second images (Continued)

to the first and second bird's-eye view images, respectively, arranges the first and the second birds-eye view images on common coordinate system with consideration of corresponding image taking positions and image taking orientations, and calculates at least one orientation parameter of the camera which minimizes position difference and rotation angle difference between the two calibration targets included in the first and second birds-eye view images. The storing control section stores the orientation parameter in storage.

20 Claims, 5 Drawing Sheets

(56) References Cited

U.S. PATENT DOCUMENTS

| | | |
|---|---|---|
| 2010/0245575 A1 | 9/2010 | Mori et al. |
| 2010/0246901 A1 | 9/2010 | Yang |
| 2011/0216194 A1 | 9/2011 | Kosaki |
| 2011/0216201 A1* | 9/2011 | McAndrew ........... G06T 7/0018 |
| | | 348/148 |
| 2012/0033087 A1* | 2/2012 | Takeda ............... G06K 9/00791 |
| | | 348/187 |

FOREIGN PATENT DOCUMENTS

| | | |
|---|---|---|
| JP | 2010-244326 A | 10/2010 |
| JP | 2011-217233 A | 10/2011 |
| JP | 4857143 B2 | 11/2011 |
| JP | 2012-15576 A | 1/2012 |

OTHER PUBLICATIONS

Written Opinion of the International Searching Authority dated Oct. 15, 2013 for the corresponding International application No. PCT/JP2013/004988 (and English translation).

Asai et al., "3D Lines Reconstruction of Road Environment Based on Structure Knowledge from In-Vehicle Camera Images," The Transactions of the Institute of Electronics, Information and Communication Engineers, Jul. 1, 2010, pp. 1236-1247, vol. J93-D, No. 7 (English outline attached; cited in the International Search Report).

* cited by examiner

IMAGE PROCESSING DEVICE AND STORAGE MEDIUM

CROSS REFERENCE TO RELATED APPLICATIONS

The present disclosure is a U.S. national stage application of PCT/JP2013/004988 filed on Aug. 23, 2013 and is based on Japanese Patent Application No. 2012-190056 filed on Aug. 30, 2012, the disclosures of which are incorporated herein by reference.

TECHNICAL FIELD

The present disclosure relates to an image processing device that performs a calibration related to camera installation to a vehicle and a storage medium including instructions for performing the calibration.

BACKGROUND ART

Conventionally, a technology is known for performing a calibration related to a camera installation to a vehicle. That is, from two images taken by the camera of the vehicle, respective feature points indicating the same object are extracted. Then, an orientation of the camera is calculated so that a difference between a distance between the two feature points on a world coordinate system and a travelling distance of the vehicle which is calculated based on the vehicle speed has a minimum value (for example, see patent literature 1).

However, the technology mentioned above has problems on two points. First, since the above-mentioned technology does not consider a movement of the vehicle in a yaw direction, a user has to drive the vehicle to go straight on during a measurement for the calibration. Thus, the user may feel burdened for driving the vehicle to go straight on. Second, the place where the calibration is performed should secure an enough distance of a straight road. Thus, the place for performing the calibration is limited.

PRIOR ART LITERATURES

Patent Literature

Patent Literature 1: JP 2011-217233 A

SUMMARY OF INVENTION

In view of the foregoing difficulties, it is an object of the present disclosure to provide an image processing device and a storage medium, each of which is able to calculate orientation parameters of a vehicle camera without driving a vehicle to go straight on.

According to a first aspect of the present disclosure, an image processing device includes an image input section, a calibration target specifying section, a vehicle information input section, a calculation section, and a storing control section. The image input section inputs multiple images taken by a camera that is equipped to a vehicle. The calibration target specifying section specifies a calibration target included both in a first image and in a second image. The first image and the second image are a part of the multiple images input by the image input section and are taken at at least two positions travelled by the vehicle. The vehicle information input section inputs information that indicates a travel distance and an orientation change of the vehicle. The calculation section converts the first image including the calibration target to a first bird's-eye view image and converts the second image including the calibration target to a second bird's-eye view image. The calculation section arranges the first bird's-eye view image on a common coordinate system with consideration of an image taking position and an image taking orientation of the first image and arranges the second bird's-eye view image on the common coordinate system with consideration of an image taking position and an image taking orientation of the second image. The image taking position and the image taking orientation of the first image and the image taking position and the image taking orientation of the second image are specified based on the information input by the vehicle information input section. The calculation section calculates at least one orientation parameter of the camera which minimizes a position difference and a rotation angle difference between the calibration target included in the first bird's-eye view image and the calibration target included in the second bird's-eye view image. The storing control section stores the at least one orientation parameter calculated by the calculation section in a storage.

With the above device, even though the movement of the vehicle includes a rotation movement, the orientation parameters of the camera taking the rotation movement in consideration are calculated. Thus, during the driving for the calibration measurement, the user may make a right or left turn, and is not required to drive the vehicle to go straight on. Thus, the measurement can be carried out with ease.

According to a second aspect of the present disclosure, a non-transitory tangible computer readable storage medium includes instructions to be executed by a computer, and the instructions for implementing acquiring multiple images taken by a camera that is equipped to a vehicle, specifying a calibration target included in both a first image and a second image, the first image and the second image being a part of the multiple images and being taken at at least two positions travelled by the vehicle, acquiring information that indicates a travel distance and an orientation change of the vehicle, converting the first image including the calibration target to a first bird's-eye view image and converting the second image including the calibration target to a second bird's-eye view image, arranging the first bird's-eye view image on a common coordinate system with consideration of an image taking position and an image taking orientation of the first image and arranging the second bird's-eye view image on the common coordinate system with consideration of an image taking position and an image taking orientation of the second image, the image taking position and the image taking orientation of the first image and the image taking position and the image taking orientation of the second image being specified based on the information that indicates the travel distance and the orientation change of the vehicle, calculating at least one orientation parameter of the camera which minimizes a position difference and a rotation angle difference between the calibration target included in the first bird's-eye view image and the calibration target included in the second bird's-eye view image, and storing the at least one orientation parameter.

With the above storage medium, even though the movement of the vehicle includes a rotation movement, the orientation parameters of the camera taking the rotation movement in consideration are calculated. Thus, during the driving for the calibration measurement, the user may make a right or left turn, and is not required to drive the vehicle to go straight on. Thus, the measurement can be carried out with ease.

According to a third aspect of the present disclosure, an image processing device includes an image input section, a calibration target specifying section, a vehicle information input section, a position relation acquiring section, a calculation section, and a storing section. The image input section inputs a first image and a second image taken by a camera that is equipped to a vehicle. The second image is taken after the vehicle travels for a distance from a position where the first image being taken. The calibration target specifying section specifies a first calibration target included in the first image and a second calibration target included in the second image. The second calibration target is a different object from the first calibration target and a shape of the first calibration target being equal to a shape of the second calibration target. The first image and the second image are input by the image input section. The vehicle information input section inputs information that indicates a travel distance and an orientation change of the vehicle between the position where the first image being taken and a position where the second image being taken. The position relation acquiring section acquires a relative position relation between the first calibration target and the second calibration target. The calculation section converts the first image to a first bird's-eye view image and converts the second image to a second bird's-eye view image. The calculation section arranges the first bird's-eye view image on a common coordinate system with consideration of an image taking position and an image taking orientation of the first image and arranges the second bird's-eye view image on the common coordinate system with consideration of an image taking position and an image taking orientation of the second image. The image taking position and the image taking orientation of the first image and the image taking position and the image taking orientation of the second image are specified based on the information input by the vehicle information input section. The calculation section calculates, based on the relative position relation between the first calibration target and the second calibration target acquired by the position relation acquiring section, at least one orientation parameter of the camera which minimizes a position difference and a rotation angle difference between the first calibration target and the second calibration target when the first calibration target and the second calibration target are overlapped with one another on the common coordinate system. The storing control section stores the orientation parameter calculated by the calculation section in the storage.

With the above device, even though the movement of the vehicle includes a rotation movement, the orientation parameters of the camera taking the rotation movement in consideration are calculated. Thus, during the driving for the calibration measurement, the user may make a right or left turn, and is not required to drive the vehicle to go straight on. Thus, the measurement can be carried out with ease.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will describe embodiments of the present disclosure with reference to the drawings.

(Configuration)

Figure 1:
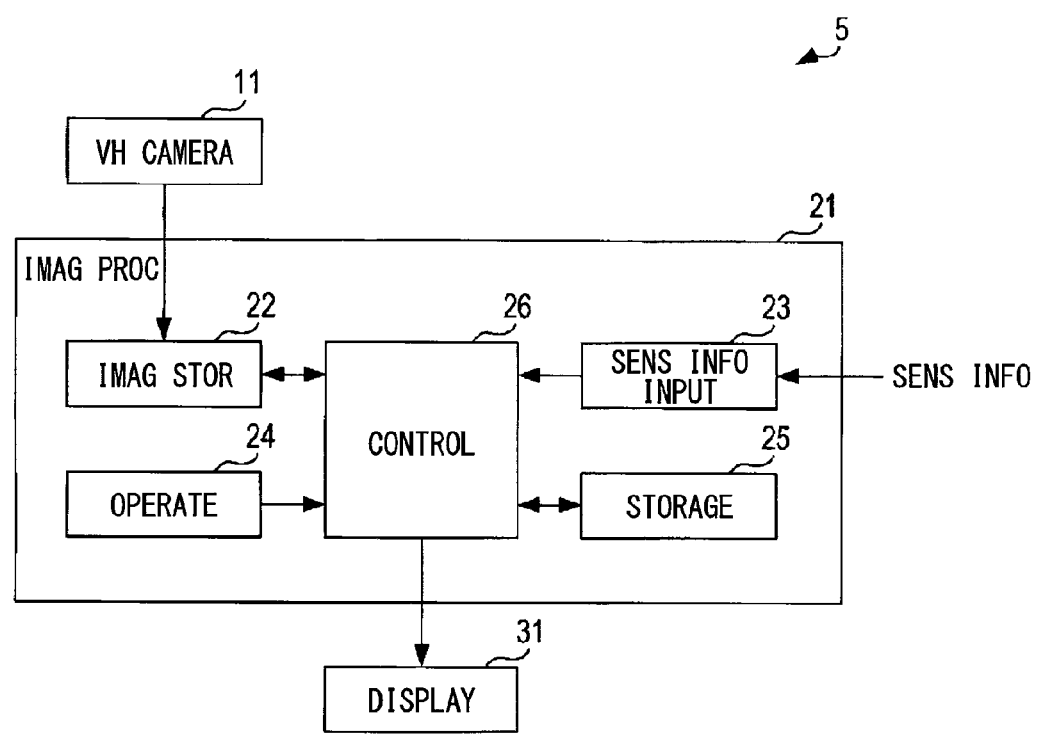
FIG. 1 is a block diagram showing a configuration of an image processing system according to an embodiment.

As shown in FIG. 1, an image processing system (IMAG PROC SYS) 5 according to the present embodiment includes a vehicle camera (VH CAMERA) 11, an image processing device (IMAG PROC) 21, and a display device (DISPLAY) 31.

Figure 2A:
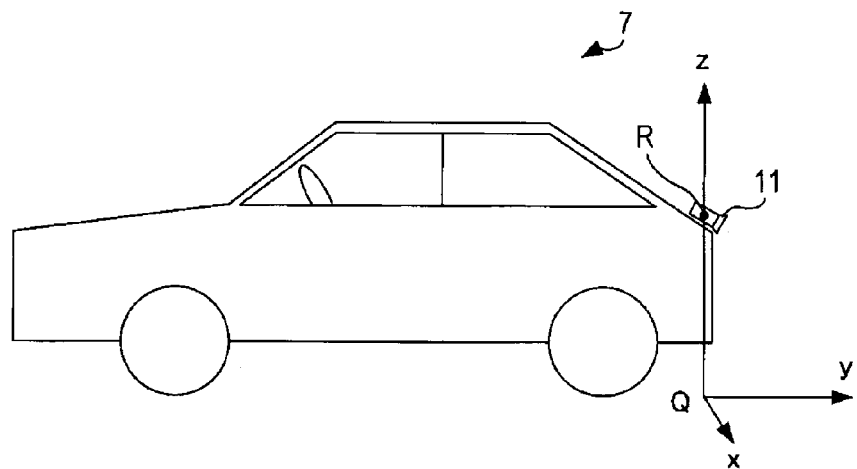
FIG. 2A is a diagram showing an installation position of a camera to a vehicle.

The vehicle camera 11 includes an image taking element, such as a charge-coupled device (CCD) element or a complementary metal oxide semiconductor (CMOS) element. The vehicle camera 11 takes images of surroundings of the vehicle, and outputs the images that are taken to the image processing device 21 at predetermined intervals (for example, 60 frames of images in one second). In the present embodiment, as shown in FIG. 2A, the vehicle camera 11 is equipped to the vehicle 7 at an upper portion of a rear end of the vehicle 7, and takes images of rear surrounding views of the vehicle. Alternatively, a vehicle camera which takes images of a lateral side views of the vehicle or takes images of front views in a travelling direction of the vehicle may be equipped to the vehicle instead of or in addition to the above-described vehicle camera 11.

The following will describe the world coordinate system used in the present embodiment with reference to FIG. 2A. In the present embodiment, an origin of the world coordinate system is defined with reference to a position of the vehicle camera 11, which corresponds to an image taken at an earlier time point among two images taken at two different time points selected at S150 of the following orientation parameter determination process. Specifically, in the world coordinate system, an intersection of a ground surface and an imaginary line that is perpendicular to the ground surface and passes through a central position R (camera view point R) of the image taking element (not shown) of the vehicle camera 11 at one image taking time point is defined as an origin Q of the world coordinate system, a rear direction of the vehicle is defined as y direction of the world coordinate system, an upward direction of the vehicle is defined as z direction of the world coordinate system, and a right direction when seeing a rear portion of the vehicle from a central portion of the vehicle is defined as x direction of the world coordinate system.

Figure 2B:
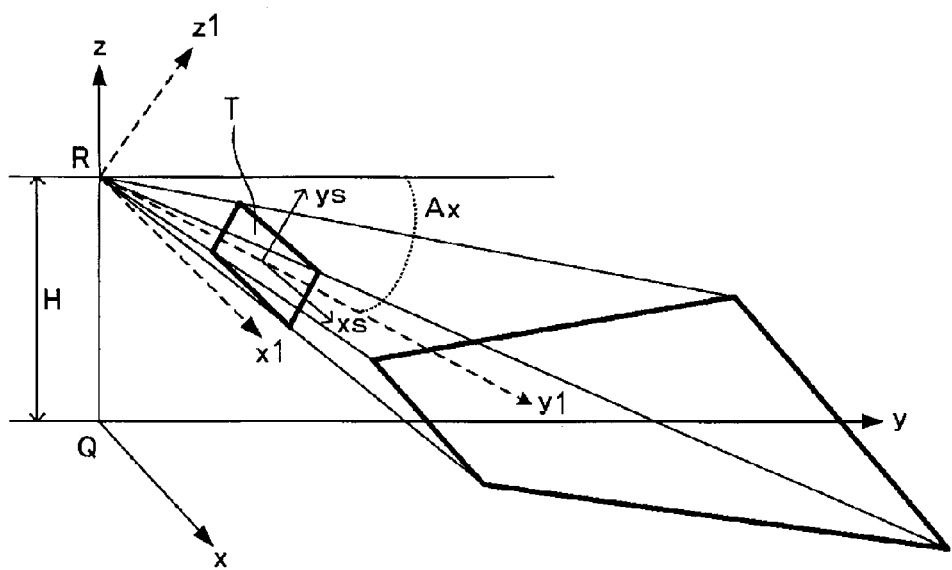
FIG. 2B is a diagram showing a coordinate system with the installation position of the camera as a reference and an optical axis direction of the camera.

The following will describe orientation parameters of the vehicle camera 11 with reference to FIG. 2B. Further, a camera coordinate system (x1, y1, z1) is defined with the camera view point R as an origin R, and a rotation angle around the x axis of the world coordinate system is defined as angle Ax, a rotation angle around the y axis of the world coordinate system is defined as angle Ay (not shown), and a rotation angle around the z axis of the world coordinate system is defined as angle Az (not shown). In the camera coordinate system, angle Ax corresponds to a pitch angle, angle Ay corresponds to a roll angle, and angle Az corresponds to a yaw angle.

The orientation parameters of the vehicle camera 11 include a coordinate of the origin R of the camera coordinate system ((0, 0, H) at a measurement start time point) in the world coordinate system, the pitch angle Ax, the roll angle Ay, and the yaw angle Az. At least one of a position of the origin R of the camera coordinate system in the x direction or a position of the origin R of the camera coordinate system in the y direction in the world coordinate system is referred to as a horizontal direction installation position of the camera 11. A position of the origin R of the camera coordinate system in the z direction in the world coordinate system is referred to as a vertical direction installation position of the camera 11. The pitch angle Ax included in the orientation parameters is also referred to as an installation pitch angle, the roll angle Ay included in the orientation parameters is also referred to as an installation roll angle, and the yaw angle Az included in the orientation parameters is also referred to as an installation yaw angle. The installation yaw angle indicates a swing angle of the vehicle camera 11 in a horizontal direction, and the installation pitch angle indicates a swing angle of the vehicle camera in a vertical direction. In the following description, it is assumed that the above-mentioned parameters (coordinates and angles) have been measured in the past, and the following process is performed in order to calibrate the orientation parameters have been measured in the past.

The display device 31 shown in FIG. 1 may be provided by a liquid crystal display or an organic light-emitting display, and displays images processed by the image processing device 21. Herein, the images are taken by the vehicle camera 11, and then, processed by the image processing device 21.

The image processing device 21 includes an image storing section (IMAG STOR) 22, a sensor information input unit (SENS INFO INPUT) 23, an operation section (OPERATE) 24, a storage (STORAGE) 25, and a controller (CONTROL) 26.

The image storing section 22 is provided by a storage device, such as a DRAM. The image storing section 22 stores images taken by the vehicle camera 11 (for example, images being taken for past 10 seconds). Herein, the vehicle camera 11 successively outputs the images that have been taken, to the image storing section 22.

The sensor information input unit 23 is an input interface for inputting moving distance information of the vehicle and rotation angle information of the vehicle. Herein, the moving distance information indicates a moving distance of the vehicle which is obtained by a vehicle speed pulse sensor or the like, and the rotation angle information indicates a rotation angle of the vehicle which is obtained by a steering angle sensor, a gyroscope or the like. The moving distance information and the rotation angle information (SENS INFO) may by directly obtained from the corresponding sensors, or may be obtained from a different information processing unit (such as ECU).

The operation section 24 may be provided by a touch panel disposed on a display surface of the display device 31 or may be provided by mechanical key buttons arranged around the display device 31. The operation section 24 receives various operations input by the user.

The storage 25 is provided by a non-volatile storage device, such as a flash memory. The storage 25 stores orientation parameters of the vehicle camera 11, a program to be executed by the controller 26, color information and shape information of a prepared calibration target or the like. The prepared calibration target will be described later in detail. The processing of the images taken by the vehicle camera 11 (for example, converting the image to the bird's-eye view image) is performed using the orientation parameters of the camera 11 stored in the storage 25. The orientation parameters may also be used for determining and reporting an abnormality in the installation position of the vehicle camera 11 or an abnormality in the installation angle of the vehicle camera 11. Herein, the abnormalities may be caused by a vibration of the vehicle.

The controller 26 is provided by a microcomputer including CPU, RAM, ROM, I/O or the like. The controller 26 reads program out from the storage 25 for carrying out various processes.

(Operation)

The following will describe an operation of the image processing device 21. In the following description, a process related to the present disclosure will be mainly described. Description of other well-known process for displaying the images taken by the vehicle camera 11 on the display device will be omitted. Herein, as an example of other well-known display process, the images taken by the vehicle camera may be converted to a bird's-eye view image and an estimated moving track of vehicle wheels may be displayed together with the bird's-eye view image for assisting a parking of the vehicle into a garage.

Figure 3:
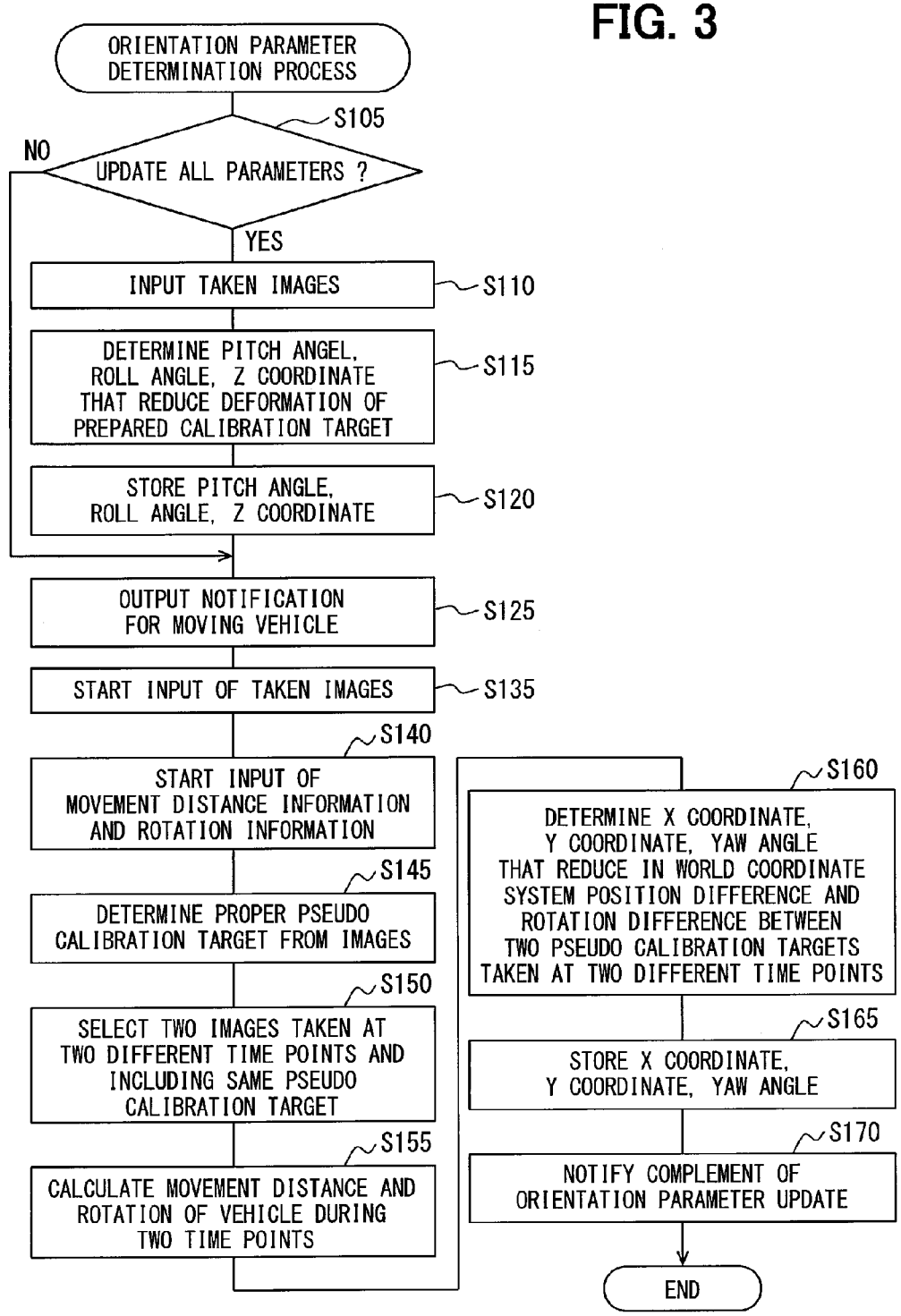
FIG. 3 is a flowchart showing an orientation parameter determination process.

The following will describe the orientation parameter determination process executed by the controller 26 of the image processing device 21 with reference to FIG. 3. When the user operates the operation section 24 during a stationary state of the vehicle in order to input an instruction for an update of the orientation parameters, the controller 26 reads out related program from the storage 25 and executes the program in order to perform the orientation parameter determination process. When the user instructs the update, the user is able to select whether to update all of the orientation parameters (full update) or to update a part of the orientation parameters (partial update). When the user selects the full update, the user needs to place a prepared calibration target within an image taking range of the vehicle camera 11 in advance, and then, input an instruction to perform the full update. The prepared calibration target is a target used in a measurement for camera orientation calibration. For example, the prepared calibration target may be provided by a square panel whose side length is equal to tens of centimeters.

When the controller 26 starts the orientation parameter determination process, the controller 26 determines whether the full update is selected by the user (S105). When the full update is selected by the user, the process proceeds to S110, and when the partial update is selected by the user, the process proceeds to S125.

At S110, the controller 26 acquires one frame of latest image including the prepared calibration target from the storing section 22. Herein the latest image including the prepared calibration target is taken by the vehicle camera 11 and is stored in the storing section 22. The image including the prepared calibration target is also referred to as a third image.

Among the orientation parameters, the controller 26 determines the pitch angle, the roll angle, and a height H of a camera view point (z coordinate) at S115 so that a deformation of the prepared calibration target included in the image acquired at S110 is minimized to a predetermined level (preferably to a minimum level). The determination of the above orientation parameters will be described in detail.

First, the controller 26 converts the image acquired at S110 to a bird's-eye view image. A conversion method is well known as disclosed in JP 10-211849 A. That is, the coordinates on a screen surface T shown in FIG. 2B is converted to the ground surface-referenced coordinates. In FIG. 2B, xs direction is parallel to a horizontal direction on the screen surface T, and ys direction is perpendicular to the xs direction on the screen surface T. In the example shown in FIG. 2B, although only the rotation around the x axis of the world coordinate system is illustrated, the rotation around the y axis and the rotation around the z axis are also considered when converting the original image taken by the vehicle camera 11 to the bird's-eye view image. Further, the conversion of the image is performed using the orientation parameters have been stored in the storage 25.

After the conversion to the bird's-eye view image, the controller 26 specifies the prepared calibration target included in the bird's-eye view image. The specifying of the prepared calibration target is performed using the color information and the shape information of the prepared calibration target. Herein, the color information and the shape information of the prepared calibration target are stored in the storage 25.

Among the orientation parameters, the controller 26 searches for the pitch angle, the roll angle, and the height H of the camera view point (z coordinate) so that the prepared calibration target included in the converted bird's-eye view image has an ideal shape (a shape specified by the shape information of the prepared calibration target which is stored in the storage 25). For example, as a searching method of each orientation parameter, a value of each orientation parameter, which is obtained by latest calibration and is stored in the storage 25, may be used as a reference value. Then, each parameter may be increased or decreased based on the reference value to obtain a test parameter, and the original image is converted to the bird's-eye view image using each test parameter. Then, the prepared calibration target in each converted bird's-eye view image is compared with the ideal shape of the prepared calibration target in order to search for one bird's-eye view image that has the shape of the prepared calibration target most similar to the ideal shape of the prepared calibration target. The storage 25 also functions as a prepared calibration target storage.

Figure 4A:
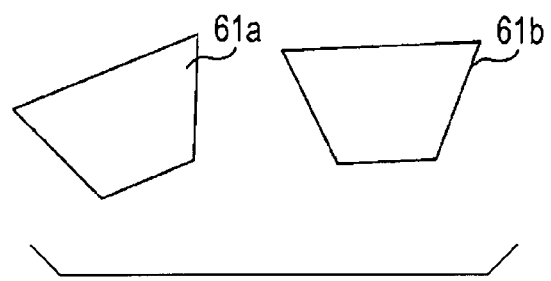
FIG. 4A is a diagram showing a bird's-eye view image of a prepared calibration target which is taken by the camera.
Figure 4B:
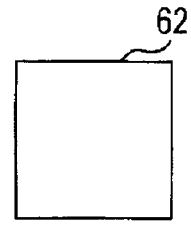
FIG. 4B is a diagram showing an ideal shape of the prepared calibration target.

FIG. 4A shows two prepared calibration targets 61a, 61b included in two respective bird's-eye view images converted from the respective images taken by the vehicle camera 11. Then, among the orientation parameters, the pitch angle, the roll angle, and the height H of the camera view point (z coordinate) are searched for so that the prepared calibration targets 61a, 61b included in two respective bird's-eye view images approach to the ideal prepared calibration target 62 (viewed from bird's-eye) shown in FIG. 4B. Further, when the square shape of the prepared calibration target becomes deformed to a trapezoid shape or an area of the prepared calibration target included in the converted image is different from an area of the ideal shape of the prepared calibration target, the pitch angle, the roll angle, and the height H of the camera view point (z coordinate) may be the main reasons of the deformation.

Return to FIG. 3, at S115, the controller 26 determines the pitch angle, the roll angle, and the height H of the camera view point (z coordination) among the orientation parameters. Then, the controller 26 updates the corresponding orientation parameters stored in the storage 25 with the newly determined orientation parameters (S120). That is, among the orientation parameters, the pitch angle, the roll angle, and the height H of the camera view point (z coordinate) are updated to the latest values.

The controller 26 notifies the user to move the vehicle by a distance (S125). Specifically, the notification may be performed by displaying an instruction on the display device 31.

The controller 26 successively acquires latest images which are taken by the vehicle camera 11 from the image storing section 22 (S135). Herein, the latest images taken by the vehicle camera 11 are stored in the image storing section 22.

The controller 26 acquires the moving distance information of the vehicle and the rotation angle information of the vehicle (S140). The rotation angle information is related to an orientation of the vehicle. Herein, the moving distance information indicates the moving distance of the vehicle which is obtained by the vehicle speed pulse sensor, and the rotation angle information indicates the rotation angle of the vehicle which is obtained by the steering angle sensor. The controller 26 stores the information acquired at S140 associated with the corresponding image acquired at S135 in the RAM of the controller 26. For example, when the images are taken at predetermined intervals, for each of the images, a moving distance of the vehicle between an immediately previous image and the current image and a rotation angle change from the immediately previous image are associated with the current image. Further, the information indicating the moving distance and the information indicating the rotation angle may be acquired from, for example, a navigation device that is able to obtain a vehicle position and a rotation angle of the vehicle.

The controller 26 analyzes the images acquired at S135 and determines a pseudo calibration target included in the images (S145). The pseudo calibration target is different from the prepared calibration target. The pseudo calibration target is not an object that is placed in purpose around the vehicle for the measurement of camera orientation calibration. In the present embodiment, a fixed object (a non-moving object including a white line on a road) existing around a ground surface of a travelling road of the vehicle may be used as the pseudo calibration target. The pseudo calibration target has a dimension equal to or greater than a predetermined dimension and has different shapes when taken multiple times by the vehicle camera during a turning of the vehicle (pseudo calibration target does not have a circular shape when viewed from bird's eye view). For example, the pseudo calibration target may be the white line on the road, a yellow line on the road, a curbstone disposed along the road, a reflection plate disposed along the road, a road pattern, a braille block on a sidewalk, or any object positioned close to the ground surface. Further, the controller 26 may select only one pseudo calibration target from the images that are taken or may select multiple pseudo calibration targets from the images that are taken. The controller 26 repeatedly executes S145 until a proper pseudo calibration target is determined. The pseudo calibration target is also referred to as a calibration target.

The controller 26 selects (S150), from the images acquired at S135, two images taken at two different time points (at two different positions) and including the same pseudo calibration target determined at S145. An interval between the two different time points may be properly set so that a moving distance of the vehicle during the interval is equal to several meters. The image taken by the camera at a first time point is referred to as a first image, and the image taken by the camera at a second time point is referred to as a second image.

The controller 26 calculates (S155) a moving distance of the vehicle between the two different time points (two different positions) corresponding to the two images selected at S150 and a rotation angle of the vehicle between the two different time points (two different positions) corresponding to the two images selected at S150. Specifically, the controller 26 calculates the moving distance and the rotation angle based on the moving distance information and the rotation angle information that are associated with each of the two images and are input at S140.

Among the orientation parameters, the controller 26 determines (S160) the x coordinate of the camera view point, the y coordinate of the camera view point, and the yaw angle so that both a difference between the positions of the pseudo calibration target corresponding to the two different time points in the world coordinate system and a difference between the rotation angles of the pseudo calibration target corresponding to the two different time points in the world coordinate system are minimized to a predetermined level (preferably to a minimum level). The following will describe the determination of the above orientation parameters.

At S150, the controller 26 converts the two images selected at S150 to respective bird's-eye view images. Specifically, the controller 26 converts the first image to a first bird's-eye view image and converts the second image to a second bird's-eye view image. The controller 26 uses the orientation parameters have been stored in the storage 25 in the past when converting the original image to the bird's-eye view image.

Among the orientation parameters, the controller 26 searches for the x coordinate of the camera view point, the y coordinate of the camera view point, and the yaw angle so that both a position difference in the world coordinate system and a rotation angle difference in the world coordinate system of the pseudo calibration target included in the respective bird's-eye view images are minimized to a predetermined level. For example, as a searching method of each orientation parameter, a value of each orientation parameter, which is obtained by latest calibration and is stored in the storage 25, may be used as a reference value. Then, each parameter may be increased or decreased based on the reference value to obtain a test parameter, and the original image is converted to the bird's-eye view image using each test parameter. Then, the pseudo calibration target in each converted bird's-eye view image is compared with one another in order to search for one second bird's-eye view image that has the shape of the pseudo calibration target most similar to the shape of the pseudo calibration target of the first bird's-eye view image.

Figure 5A:
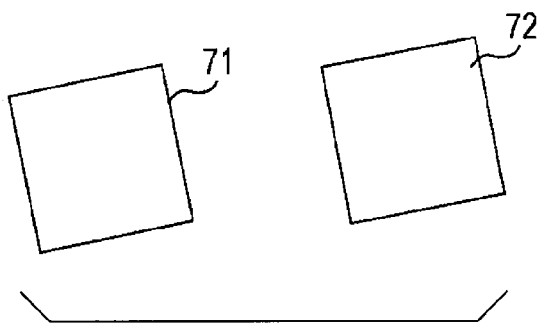
FIG. 5A is a diagram showing a bird's-eye view image of pseudo calibration targets at a first time point.

The following will describe an example of a position difference (displacement) of the pseudo calibration target and a rotation angle difference (rotation shift) of the pseudo calibration target. FIG. 5A shows bird's-eye view image converted from an original image, which is taken by the vehicle camera at the first time point and is selected at S150. As shown in FIG. 5A, the bird's-eye view image includes two pseudo calibration targets 71, 72. In the bird's-eye view image shown in FIG. 5A, the two square-shaped pseudo calibration targets 71, 72 are arranged in a right left direction, and are rotated in a counterclockwise direction compared with the two pseudo calibration targets 71, 72 shown in FIG. 5B.

Figure 5B:
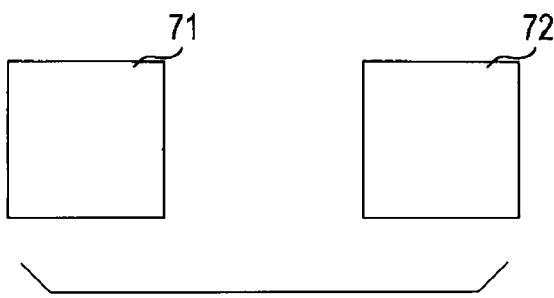
FIG. 5B is a diagram showing a bird's-eye view image of pseudo calibration targets at a second time point.

FIG. 5B shows bird's-eye view image converted from an original image, which is taken by the vehicle camera at the second time point and is selected at S150. As shown in FIG. 5B, the bird's-eye view image includes two pseudo calibration targets 71, 72. The two pseudo calibration targets 71, 72 shown in FIG. 5A are the same pseudo calibration targets with the two pseudo calibration targets 71, 72 shown in FIG. 5B. In the bird's-eye view image shown in FIG. 5B, the two square-shaped pseudo calibration targets 71, 72 are arranged in the right left direction, and are rotated (aligned on the drawing sheet) in a clockwise direction compared with the two pseudo calibration targets 71, 72 shown in FIG. 5A.

Figure 5C:
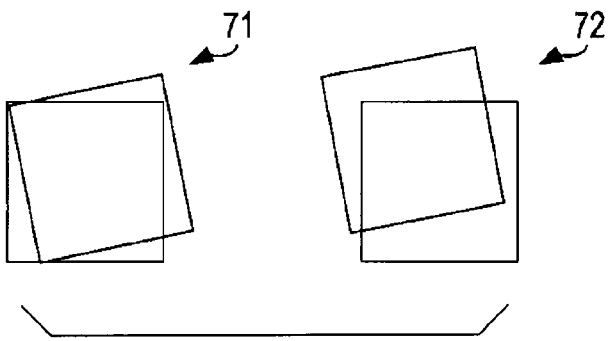
FIG. 5C is a diagram showing the bird's-eye view image of the pseudo calibration targets at the first time point and the bird's-eye view image of the pseudo calibration targets at the second time point when they are arranged on a world coordinate system.

FIG. 5C is a diagram in which FIG. 5A and FIG. 5B are arranged on the same coordinate system. That is, FIG. 5C is a diagram showing the pseudo calibration targets 71, 72 taken at the first time point and the pseudo calibration targets 71, 72 taken at the second time point on the world coordinate system. As shown in FIG. 5C, the pseudo calibration targets 71, 72 taken at the first time point and the pseudo calibration targets 71, 72 taken at the second time point have the position difference (displacement) and the rotation angle difference (rotation shift). Among the orientation parameters, the x coordinate of the camera view point, the y coordinate of the camera view point, and the yaw angle are searched for in order to minimize both the position difference and the rotation angle difference. The x coordinate of the camera view point, the y coordinate of the camera view point, and the yaw angle may be the main reasons of the position difference and the rotation angle difference.

Return to FIG. 3, at S160, the controller 26 determines the x coordinate of the camera view point, the y coordinate of the camera view point, and the yaw angle among the orientation parameters. Then, the controller 26 updates the corresponding orientation parameters stored in the storage 25 with the newly determined orientation parameters (S165). That is, among the orientation parameters, the x coordinate of the camera view point, the y coordinate of the camera view point, and the yaw angle are updated to the latest values.

The controller 26 notifies an update completion of all of the orientation parameters to the user (S170). Specifically, the notification may be performed by displaying a message on the display device 31. After the notification, the controller 26 ends the process (orientation parameter determination process).

With above-described image processing device 21, even when the vehicle rotates or turns in any direction during the travelling, the orientation parameters of the vehicle camera 11 may be calculated with consideration of the rotation or turning of the vehicle. That is, during the driving for calibration measurement, the user may make a right or left turn, and is not required to drive the vehicle to go straight on. Thus, the measurement can be carried out with ease.

Further, a marker or a panel (above-described prepared calibration target) placed in purpose around the vehicle for the measurement purpose may also be utilized as the pseudo calibration target. Further, an object other than the object placed for the measurement purpose, such as an object already existing around the ground surface of the road and is distinguishable from the ground surface of the road may also be used as the pseudo calibration target. Further, the prepared calibration target may be provided by any object whose color information and shape information are preliminarily stored in the storage 25. The prepared calibration target is not limited to the marker or the panel placed in purpose around the vehicle. For example, when the color information and the shape information of the white line on the road surface are preliminarily obtained, the white strip on the road surface may also be used as the prepared calibration target.

With the above-described image processing device 21, the orientation parameters of the camera 11 can be calculated without setting the prepared calibration target in purpose, such as the marker, before the measurement.

Further, at S160, among the orientation parameters, at least one of the horizontal direction installation position of the camera 11 or the installation yaw angle (swing angle in the horizontal direction) is calculated. The horizontal direction installation position of the camera 11 includes one of the coordinates (x coordinate or y coordinate) in the perpendicular coordinate system on a horizontal plane, or includes both the coordinates (x coordinate and y coordinate) in the perpendicular coordinate system on the horizontal plane.

At S160, above-described orientation parameters having high accuracies can be calculated.

Further, shape information indicating an original shape of the prepared calibration target is preliminarily stored in the storage 25. The original image (third image) taken by the camera and including the prepared calibration target is converted to the third bird's-eye view image. Then, at S115, orientation parameters other than the orientation parameters to be calculated at S160, may be calculated so that a difference between the shape of the prepared calibration target included in the third bird's-eye view image and the original shape of the prepared calibration target is minimized. Herein, the original shape of the prepared calibration target is specified based on the shape information indicating the original shape of the prepared calibration target and being preliminarily stored in the storage 25. The orientation parameters calculated at S115 are also stored in the storage 25. Herein, the shape difference may include a dimension difference or a shape deformation.

With above-described image processing device 21, the calculated parameters are used for the camera orientation calibration. Thus, the calibration can be performed more properly and more accurately.

The orientation parameters calculated at S115 include at least one of the installation pitch angle (swing angle in the vertical direction), installation roll angle, or the vertical direction installation position.

At S115, above-described orientation parameters having high accuracies can be calculated.

As shown in FIG. 3, in the present embodiment, a process executed by the controller 26 at S135 functions as an image input section (image input means), a process executed by the controller 26 at S145 functions as a calibration target specifying section (calibration target specifying means), a process executed by the controller 26 at S140 functions as a vehicle information input section (vehicle information input means), a process executed by the controller 26 at S135 functions as an image input section (image input means), a process executed by the controller 26 at S160 functions as a first calculation section (first calculation means), a process executed by the controller 26 at S115 functions as a second calculation section (second calculation means), and a process executed by the controller 26 at S165 functions as a storing control section (storing control means).

(Modification)

An image processing device according to a modification of the above-described embodiments includes an image input section (S135), a calibration target specifying section (S145), a vehicle information input section (S140), a position relation acquiring section, a calculation section (S160), and a storing control section (S165). The image input section (S135) inputs, to the image processing device 21, the first image taken by the vehicle camera 11 and the second image taken by the vehicle camera 11. The second image is taken after the vehicle travels a distance from a position where the first image is taken. The calibration target specifying section (S145) specifies a first calibration target included in the first image and a second calibration target, which is included in the second image and has the same shape with the first calibration target. Herein, the second calibration target is a different object from the first calibration target, and the first image and the second image are input by the image input section (S135). The vehicle information input section (S140) inputs information indicating a travelling distance of the vehicle between a position at which the first image is taken and a position at which the second image is taken and indicating a change of a vehicle orientation between the two positions. The position relation acquiring section acquires a relative position relation between the first calibration target and the second calibration target that are different from one another. The calculation section (S160) converts the first image to the first bird's-eye view image and converts the second image to the second bird's-eye view image, arranges the first bird's-eye view image on a common coordinate system based on the image taking position where the first image is taken and the image taking orientation of the first image, arranges the second bird's-eye view image on the common coordinate system based on the image taking position where the second image is taken and the image taking orientation of the second image. Herein, the image taking positions and the image taking orientations of the images are specified based on the information input from the vehicle information input section (S140). Then, the calculation section (S160), based on the position relation between the first calibration target and the second calibration target, calculates at least one of the orientation parameters of the camera 11 so that a position difference and a rotation angle difference between the first calibration target and the second calibration target are minimized when the second calibration target is overlapped with the first calibration target in the common coordinate system. Herein, the position relation is acquired by the position relation acquiring section. The storing control section (S165) stores the orientation parameters calculated by the calculation section (S160) in the storage 25. Herein, the second calibration target may be an object positioned at a different place from the first calibration target, but has the same shape with the first calibration target.

(Effects of Embodiments)

The above-described image processing device 21 arranges two images of the same pseudo calibration target included in two different images and taken at two different positions on the ground surface of the common world coordinate system with consideration of the movement and rotation of the vehicle. Among the orientation parameters of the vehicle camera 11, the horizontal direction installation position and the installation yaw angle are calibrated so that the position difference and the rotation angle difference of the two images of the pseudo calibration targets are minimized when the two pseudo calibration targets are viewed from the bird's-eye view. Herein, the horizontal direction installation position is indicated by the x coordinate and the y coordinate of the camera view point. Each of the horizontal direction installation position and the installation yaw angle is also referred to as a first type orientation parameter. Thus, the orientation parameters can be calculated with consideration of a rotation movement of the vehicle.

Accordingly, the turning or the rotation of the vehicle is not restricted during the measurement without limitation.

The image processing device 21 selects and determines one of various objects existing around the ground surface close to the vehicle as the pseudo calibration target. Thus, the pseudo calibration target is not necessary to be placed in purpose around the vehicle before the measurement like the prepared calibration target. The user just needs to drive the vehicle in the vicinity of the pseudo calibration target, and thereby, the x coordinate of the camera view point, the y coordinate of the camera view point; and the yaw angle among the orientation parameters can be calibrated.

Among the orientation parameters of the vehicle camera 11, the installation pitch angle, the installation roll angle, and the height of the camera view point (vertical direction installation position indicated by the z coordinate) can be calibrated based on the deformation degree of the prepared calibration target (the calibration target other than the pseudo calibration target) included in the bird's-eye view image, before calculating the x coordinate of the camera view point, the y coordinate of the camera view point, and the yaw angle. Herein, each of the installation pitch angle, the installation roll angle, and the height of the camera view point is also referred to as a second type orientation parameter. Thus, among the orientation parameters, accuracies of the x coordinate of the camera view point, the y coordinate of the camera view point, and the yaw angle can be improved, and all of the orientation parameters of the vehicle camera 11 (x coordinate, y coordinate, z coordinate, pitch angle, roll angle, and yaw angle) can be calculated with high accuracies.

Other Embodiments (1) In the foregoing embodiments, the two images taken at two different time points (at two different positions) include the same pseudo calibration target (S150). As another example, three or more images may be taken at three or more different time points (at three or more different positions) and can be used to perform the calibration. With this configuration, orientation parameters having high accuracies can be calculated.

(2) In the foregoing embodiments, only one vehicle camera 11 is equipped to the vehicle so that rear view of the vehicle 7 can be taken by the vehicle camera 11. As another example, multiple cameras may be equipped to the vehicle 7. When multiple cameras are equipped to the vehicle, the front view, the rear view, and the lateral side view can be taken by the multiple cameras. When multiple cameras are equipped to the vehicle, the orientation parameter determination process described above may be performed in each of the multiple cameras.

(4) In the foregoing embodiments, the controller 26 of the image processing device 21 executes all of the steps included in the orientation parameter determination process. As another example, a part of the steps can be performed by a different information processing device. That is, data necessary for executing a part of the steps may be transmitted to the different information processing device, and the controller 26 may receive the result data processed by the different information processing device from the different information processing device in order to achieve the orientation parameter determination process. The different information processing device may be a device equipped to the vehicle, or may be a device that is not equipped to the vehicle and is communicable with other devices via a communication network. When a part of the steps are performed by the different information processing device, the processing load of the image processing device 21 can be reduced, and a hardware configuration of the image processing device 21 can be simplified.

(5) In the foregoing embodiments, in the orientation parameter determination process, the pseudo calibration target is used in S145 to S160. As another example, the prepared calibration target (panel or the like that is placed in purpose around the vehicle for the measurement purpose) may be used in S145 to S160 instead of the pseudo calibration target. That is, the prepared calibration target may be preliminarily placed in purpose around a road to be travelled by the vehicle, and the vehicle travels along the road. Then, the controller 26 may carry out the processes at S145 to S160.

The present disclosure also provides a non-transitory tangible computer readable storage medium that includes instructions for the image processing described above. Herein, the controller 26 executes the image processing based on the instructions stored in the storage medium.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. An image processing device comprising:
a microcomputer, the microcomputer is configured to
input a plurality of images taken by a camera that is equipped to a vehicle;
specify a calibration target included both in a first image and in a second image, the first image and the second image being a part of the plurality of images which are input and being taken at a plurality of positions travelled by the vehicle;
input information that indicates a travel distance and an orientation change of the vehicle;
convert the first image including the calibration target to a first bird's-eye view image and converting the second image including the calibration target to a second bird's-eye view image,
arrange the first bird's-eye view image on a common coordinate system with consideration of an image taking position and an image taking orientation of the first image and arrange the second bird's-eye view image on the common coordinate system with consideration of an image taking position and an image taking orientation of the second image, the image taking position and the image taking orientation of the first image and the image taking position and the image taking orientation of the second image being specified based on the information input that indicates the travel distance and the orientation change of the vehicle, calculate both (i) a rotation angle difference between the calibration target included in the first bird's eye view image and the calibration target included in the second bird's-eye view image, and (ii) a position difference between the calibration target included in the first bird's-eye view image and the calibration target included in the second bird's-eye view image, and calculate at least one orientation parameter of the camera which minimizes both (i) the position difference and (ii) a rotation angle difference between the calibration target included in the first bird's-eye view image and the calibration target included in the second bird's-eye view image; and store the at least one orientation parameter which is calculated in a storage, wherein the microcomputer calibrates each of the plurality of images taken by the camera based on the at least one orientation parameter stored in the storage, and then outputs the plurality of images which are calibrated to a display device.

2. The image processing device according to claim 1, wherein the microcomputer is further configured to set an object existing close to a road surface and being distinguishable from the road surface as the calibration target.

3. The image processing device according to claim 1, wherein the at least one orientation parameter includes at least one of a horizontal direction installation position of the camera or an installation yaw angle of the camera.

4. The image processing device according to claim 1, wherein the microcomputer is further configured to store a shape information indicating an original shape of a prepared calibration target, the prepared calibration target being different from the calibration target, the at least one orientation parameter being referred to as at least one first type orientation parameter; and calculate at least one second type orientation parameter of the camera, the at least one second type orientation parameter being different from the at least one first type orientation parameter, convert a third image that is taken by the camera and input by the image input section to a third bird's-eye view image, the third image including the prepared calibration target, wherein the at least one second type orientation parameter of the camera is calculated to minimize a position difference and a rotation angle difference between the prepared calibration target included in the third bird's-eye view image and the original shape of the prepared calibration target which is specified based on the shape information stored in the prepared calibration target storage, and store the at least one second type orientation parameter which is calculated in the storage.

5. The image processing device according to claim 4, wherein the at least one second type orientation parameter includes at least one of an installation pitch angle of the camera, an installation roll angle of the camera, or a vertical direction installation position of the camera.

6. The image processing device according to claim 4, wherein the microcomputer is further configured to convert the first image to the first bird's-eye view image based on the second type orientation parameter which is calculated at a past time and stored in the storage, and convert the second image to the second bird's-eye view image based on the second type orientation parameter which is calculated at the past time and stored in the storage.

7. The image processing device according to claim 4, wherein the calibration target includes at least one of a white line on a road surface, a yellow line on the road surface, a curbstone positioned along a road, a reflection plate positioned along the road, a road pattern, or a braille block on a sidewalk, and the prepared calibration target is a target being placed around the vehicle for a measurement purpose and the prepared calibration target includes at least one of a marker placed around the vehicle or a panel placed around the vehicle.

8. A non-transitory tangible computer readable storage medium comprising instructions to be executed by a computer, the instructions for implementing:

acquiring a plurality of images taken by a camera that is equipped to a vehicle;

specifying a calibration target included in both a first image and a second image, the first image and the second image being a part of the plurality of images and being taken at a plurality of positions travelled by the vehicle;

acquiring information that indicates a travel distance and an orientation change of the vehicle;

converting the first image including the calibration target to a first bird's-eye view image and converting the second image including the calibration target to a second bird's-eye view image;

arranging the first bird's-eye view image on a common coordinate system with consideration of an image taking position and an image taking orientation of the first image and arranging the second bird's-eye view image on the common coordinate system with consideration of an image taking position and an image taking orientation of the second image, the image taking position and the image taking orientation of the first image and the image taking position and the image taking orientation of the second image being specified based on the information that indicates the travel distance and the orientation change of the vehicle;

calculating both (i) a rotation angle difference between the calibration target included in the first bird's-eye view image and the calibration target included in the second bird's-eye view image, and (ii) a position difference between the calibration target included in the first bird's-eye image and the calibration target included in the second bird's-eye view image;

calculating at least one orientation parameter of the camera which minimizes both (i) the position difference and (ii) the rotation angle difference between the calibration target included in the first bird's-eye view image and the calibration target included in the second bird's-eye view image; and storing, in a storage, the at least one orientation parameter which is calculated, wherein each of the plurality of images taken by the camera is calibrated based on the at least one orientation parameter stored in the storage, and then the plurality of images which are calibrated are outputted to a display device.

9. An image processing device comprising:

a microcomputer, the microcomputer is configured to input a first image and a second image taken by a camera that is equipped to a vehicle, the second image being taken after the vehicle travels a distance from a position where the first image being taken;

specify a first calibration target included in the first image and a second calibration target included in the second image, the second calibration target being a different object from the first calibration target and a shape of the first calibration target being equal to a shape of the second calibration target, the first image and the second image being input by the camera;

input information that indicates a travel distance and an orientation change of the vehicle between the position where the first image is taken and a position where the second image is taken;

acquire a relative position relation between the first calibration target and the second calibration target;

convert the first image to a first bird's-eye view image and convert the second image to a second bird's-eye view image, arrange the first bird's-eye view image on a common coordinate system with consideration of an image taking position and an image taking orientation of the first image and arrange the second bird's-eye view image on the common coordinate system with consideration of an image taking position and an image taking orientation of the second image, the image taking position and the image taking orientation of the first image and the image taking position and the image taking orientation of the second image being specified based on the information which is input that indicates the travel distance and the orientation change of the vehicle between the position where the first is taken and the position where the second image is taken, calculate, based on the relative position relation between the first calibration target and the second calibration target which are acquired, both (i) a rotation angle difference between the first calibration target and the second calibration target and (ii) a position difference between the first calibration target and the second calibration target, and calculate at least one orientation parameter of the camera which minimizes (i) the position difference and (ii) the rotation angle difference between the first calibration target and the second calibration target when the first calibration target and the second calibration target are overlapped with one another on the common coordinate system; and store the orientation parameter which is calculated in the storage, wherein the microcomputer calibrates each of the plurality of images taken by the camera based on the at least one orientation parameter stored in the storage, and then the images which are calibrated to a display device.

10. The non-transitory tangible computer readable storage medium according to claim 8, further comprising
setting an object existing close to a road surface and being distinguishable from the road surface as the calibration target.

11. The non-transitory tangible computer readable storage medium according to claim 8, wherein
the at least one orientation parameter includes at least one of a horizontal direction installation position of the camera or an installation yaw angle of the camera.

12. The non-transitory tangible computer readable storage medium according to claim 8, further comprising
storing a shape information indicating an original shape of a prepared calibration target, the prepared calibration target being different from the calibration target, the at least one orientation parameter being referred to as at least one first type orientation parameter; and
calculating at least one second type orientation parameter of the camera, the at least one second type orientation parameter being different from the at least one first type orientation parameter, converting a third image that is taken by the camera and input by the image input section to a third bird's-eye view image, the third image including the prepared calibration target, wherein the at least one second type orientation parameter of the camera is calculated to minimize a position difference and a rotation angle difference between the prepared calibration target included in the third bird's-eye view image and the original shape of the prepared calibration target which is specified based on the shape information stored in the prepared calibration target storage, and storing the at least one second type orientation parameter which is calculated in the storage.

13. The non-transitory tangible computer readable storage medium according to claim 12, wherein
the at least one second type orientation parameter includes at least one of an installation pitch angle of the camera, an installation roll angle of the camera, or a vertical direction installation position of the camera.

14. The non-transitory tangible computer readable storage medium according to claim 12, further comprising
converting the first image to the first bird's-eye view image based on the second type orientation parameter which is calculated at a past time and stored in the storage, and convert the second image to the second bird's-eye view image based on the second type orientation parameter which is calculated at the past time and stored in the storage.

15. The non-transitory tangible computer readable storage medium according to claim 12, wherein
the calibration target includes at least one of a white line on a road surface, a yellow line on the road surface, a curbstone positioned along a road, a reflection plate positioned along the road, a road pattern, or a braille block on a sidewalk, and
the prepared calibration target is a target being placed around the vehicle for a measurement purpose and the prepared calibration target includes at least one of a marker placed around the vehicle or a panel placed around the vehicle.

16. The image processing device according to claim 9, wherein
the microcomputer is further configured to set an object existing close to a road surface and being distinguishable from the road surface as the calibration target.

17. The image processing device according to claim 9, wherein
the at least one orientation parameter includes at least one of a horizontal direction installation position of the camera or an installation yaw angle of the camera.

18. The image processing device according to claim 9, wherein the microcomputer is further configured to
store a shape information indicating an original shape of a prepared calibration target, the prepared calibration target being different from the calibration target, the at least one orientation parameter being referred to as at least one first type orientation parameter; and
calculate at least one second type orientation parameter of the camera, the at least one second type orientation parameter being different from the at least one first type orientation parameter,
convert a third image that is taken by the camera and input by the image input section to a third bird's-eye view image, the third image including the prepared calibration target, wherein the at least one second type orientation parameter of the camera is calculated to minimize a position difference and a rotation angle difference between the prepared calibration target included in the third bird's-eye view image and the original shape of the prepared calibration target which is specified based on the shape information stored in the prepared calibration target storage, and store the at least one second type orientation parameter which is calculated in the storage.

19. The image processing device according to claim 18, wherein the at least one second type orientation parameter includes at least one of an installation pitch angle of the camera, an installation roll angle of the camera, or a vertical direction installation position of the camera.

20. The image processing device according to claim 18, wherein the microcomputer is further configured to convert the first image to the first bird's-eye view image based on the second type orientation parameter which is calculated at a past time and stored in the storage, and convert the second image to the second bird's-eye view image based on the second type orientation parameter which is calculated at the past time and stored in the storage.

* * * * *